United States Patent
Grusy et al.

(10) Patent No.: US 8,738,880 B2
(45) Date of Patent: May 27, 2014

(54) THROTTLING STORAGE INITIALIZATION FOR DATA DESTAGE

(75) Inventors: Ellen J. Grusy, Tucson, AZ (US);
Matthew J. Kalos, Tucson, AZ (US);
Kurt A. Lovrien, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 12/857,736

(22) Filed: Aug. 17, 2010

(65) Prior Publication Data

US 2012/0047511 A1 Feb. 23, 2012

(51) Int. Cl.
*G06F 13/00* (2006.01)
*G06F 13/28* (2006.01)
*G06F 12/00* (2006.01)
*G06F 12/02* (2006.01)
*G06F 3/06* (2006.01)

(52) U.S. Cl.
CPC .............. *G06F 12/02* (2013.01); *G06F 3/0632* (2013.01); *G06F 2211/1097* (2013.01); *G06F 2201/84* (2013.01)
USPC ........... 711/170; 707/610; 707/619; 707/638; 707/639; 711/100; 711/111; 711/112; 711/162; 711/172; 713/1; 713/2; 718/104; 718/105

(58) Field of Classification Search
USPC ......... 711/172, 154, 155, 156, 157, 158, 159, 711/160, 161, 162, 163, 164, 165, 166, 170, 711/171, 173
See application file for complete search history.

(56) References Cited

U.S. PATENT DOCUMENTS

| | | | | |
|---|---|---|---|---|
| 4,394,733 A | * | 7/1983 | Swenson | 711/3 |
| 4,413,317 A | * | 11/1983 | Swenson | 711/114 |
| 4,428,043 A | * | 1/1984 | Catiller et al. | 709/250 |
| 5,568,628 A | * | 10/1996 | Satoh et al. | 711/113 |
| 5,636,359 A | * | 6/1997 | Beardsley et al. | 711/122 |
| 6,101,600 A | | 8/2000 | Arnold et al. | |
| 6,243,795 B1 | | 6/2001 | Yang et al. | |
| 6,336,150 B1 | * | 1/2002 | Ellis et al. | 710/5 |
| 6,516,379 B1 | * | 2/2003 | Deshpande et al. | 710/310 |
| 6,571,312 B1 | * | 5/2003 | Sugai et al. | 711/103 |
| 7,020,770 B2 | | 3/2006 | Smith et al. | |
| 7,031,928 B1 | * | 4/2006 | Cochran | 705/7.11 |

(Continued)

OTHER PUBLICATIONS

Hierarchical RAID: Design, performance, reliability, and recovery, Thomasian et al, Journal of Parallel and Distributed Computing, vol. 72, Issue 12, Dec. 2012, pp. 1753-1769.*

(Continued)

*Primary Examiner* — Arpan P. Savla
*Assistant Examiner* — Daniel C Chappell
(74) *Attorney, Agent, or Firm* — Griffiths & Seaton PLLC

(57) ABSTRACT

Method, system, and computer program product embodiments for throttling storage initialization for data destage in a computing storage environment are provided. An implicit throttling operation is performed by limiting a finite resource of a plurality of finite resources available to a background initialization process, the background initialization process adapted for performing the storage initialization ahead of a data destage request. If a predefined percentage of the plurality of finite resources is utilized, at least one of the plurality of finite resources is deferred to a foreground process that is triggered by the data destage request, the foreground process adapted to perform the storage initialization ahead of a data destage performed pursuant to the data destage request. An explicit throttling operation is performed by examining a snapshot of storage activity occurring outside the background initialization process.

19 Claims, 6 Drawing Sheets

(56) References Cited

U.S. PATENT DOCUMENTS

| | | | |
|---|---|---|---|
| 7,058,764 B2* | 6/2006 | Bearden | 711/129 |
| 7,080,174 B1* | 7/2006 | Thorsbakken et al. | 710/112 |
| 7,082,456 B2* | 7/2006 | Mani-Meitav et al. | 709/203 |
| 7,092,975 B2* | 8/2006 | Bradley et al. | 1/1 |
| 7,120,766 B2* | 10/2006 | Ash et al. | 711/159 |
| 7,171,516 B2* | 1/2007 | Lowe et al. | 711/113 |
| 7,181,548 B2* | 2/2007 | Ellis et al. | 710/5 |
| 7,191,207 B2* | 3/2007 | Blount et al. | 709/200 |
| 7,519,725 B2* | 4/2009 | Alvarez et al. | 709/232 |
| 7,694,119 B1* | 4/2010 | Scharland et al. | 713/1 |
| 7,743,171 B1* | 6/2010 | Hwang et al. | 710/5 |
| 7,801,861 B2* | 9/2010 | Wong et al. | 707/659 |
| 7,937,548 B2* | 5/2011 | Sampathkumar | 711/162 |
| 7,953,926 B2* | 5/2011 | Yang et al. | 711/113 |
| 7,962,709 B2* | 6/2011 | Agrawal | 711/162 |
| 8,176,272 B2* | 5/2012 | Augenstein et al. | 711/162 |
| 8,312,315 B2* | 11/2012 | Matsui | 714/6.22 |
| 8,335,770 B2* | 12/2012 | Merchant et al. | 707/682 |
| 8,352,691 B2* | 1/2013 | Grusy et al. | 711/156 |
| 8,504,520 B2* | 8/2013 | Davydok et al. | 707/619 |
| 8,595,458 B2* | 11/2013 | Hatfield | 711/166 |
| 2004/0205296 A1* | 10/2004 | Bearden | 711/129 |
| 2004/0215877 A1* | 10/2004 | Chatterjee et al. | 711/114 |
| 2004/0236846 A1* | 11/2004 | Alvarez et al. | 709/223 |
| 2005/0071550 A1* | 3/2005 | Lowe et al. | 711/113 |
| 2006/0136662 A1* | 6/2006 | Forrer et al. | 711/112 |
| 2007/0083746 A1 | 4/2007 | Fallon et al. | |
| 2008/0159059 A1* | 7/2008 | Moyer | 365/236 |
| 2008/0162858 A1* | 7/2008 | Moyer | 711/170 |
| 2008/0259764 A1* | 10/2008 | Bates et al. | 369/103 |
| 2009/0049226 A1* | 2/2009 | Candelaria et al. | 711/3 |
| 2009/0172333 A1 | 7/2009 | Marcu et al. | |
| 2009/0327681 A1* | 12/2009 | Rangarajan et al. | 713/2 |
| 2011/0231369 A1* | 9/2011 | Kawamura et al. | 707/659 |
| 2012/0047337 A1* | 2/2012 | Grusy et al. | 711/162 |
| 2012/0203935 A1* | 8/2012 | Kalos et al. | 710/5 |
| 2013/0124812 A1* | 5/2013 | Grusy et al. | 711/166 |

OTHER PUBLICATIONS

STOW: A Spatially and Temporally Optimized Write Caching Algorithm, Gill et al, USENIX'09 Proceedings of the 2009 conference on USENIX Annual technical conference, pp. 26-26, USENIX Association Berkeley, CA, USA © 2009.*

Triage: Performance Isolation and Differentiation for Storage Systems, Karlsson et al, HP Internet Systems and Storage Laboratory, Mar. 10, 2004 (24 pages), retrieved from http://www.hpl.hp.com/techreports/2003/HPL-2004-40.pdf on Jan. 7, 2014.*

Magnus Karsson et al., "Triage: Performance Isolation and Differentiation for Storage Systems," IEEE, Oct. 5, 2004, 8 pages.

* cited by examiner

THROTTLING STORAGE INITIALIZATION FOR DATA DESTAGE

BACKGROUND OF THE INVENTION

1. Field of the Invention

The present invention relates in general to computers, and more particularly to a method, system, and computer program product for throttling of storage initialization operations in a computing storage environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

In-process initialization work (i.e., formatting) on an associated storage unit or collection of storage units as previously described may impact input/output (I/O) performance due to use of system resources (e.g., central processing unit, adapters, etc.). Accordingly mechanisms whereby such initialization work may be performed that lessen the load on such system resources are desirable.

In view of the foregoing, various method, system, and computer program product embodiments for throttling storage initialization for data destage in a computing storage environment are provided. In one embodiment, by way of example only, an implicit throttling operation is performed by limiting a finite resource of a plurality of finite resources available to a background initialization process, the background initialization process adapted for performing the storage initialization ahead of a data destage request. If a predefined percentage of the plurality of finite resources is utilized, at least one of the plurality of finite resources is deferred to a foreground process that is triggered by the data destage request, the foreground process adapted to perform the storage initialization ahead of a data destage performed pursuant to the data destage request. An explicit throttling operation is performed by examining a snapshot of storage activity occurring outside the background initialization process. If the storage activity exceeds a predetermined level: the storage initialization is at least one of limited to one of a predetermined number and size of portions of the storage per a predetermined time, and a delay is injected into the background initialization process.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below describe efficient and highly scalable mechanisms for facilitation of throttling storage initialization task(s) on one or more storage units to lessen impact on overall storage performance. In one of the illustrated embodiments, initialization on a storage unit (or collection of units) is performed on demand when a data destage operation is requested to an uninitialized portion of storage (such as a track), and also performed by a background process adapted to perform initialization tasks ahead of demand. Implicit throttling of background initialization work remains in place. When certain levels of storage (e.g., read/write) activity are detected, additional specific actions may be undertaken to explicitly throttle any background initialization work as will be further described.

Figure 1:
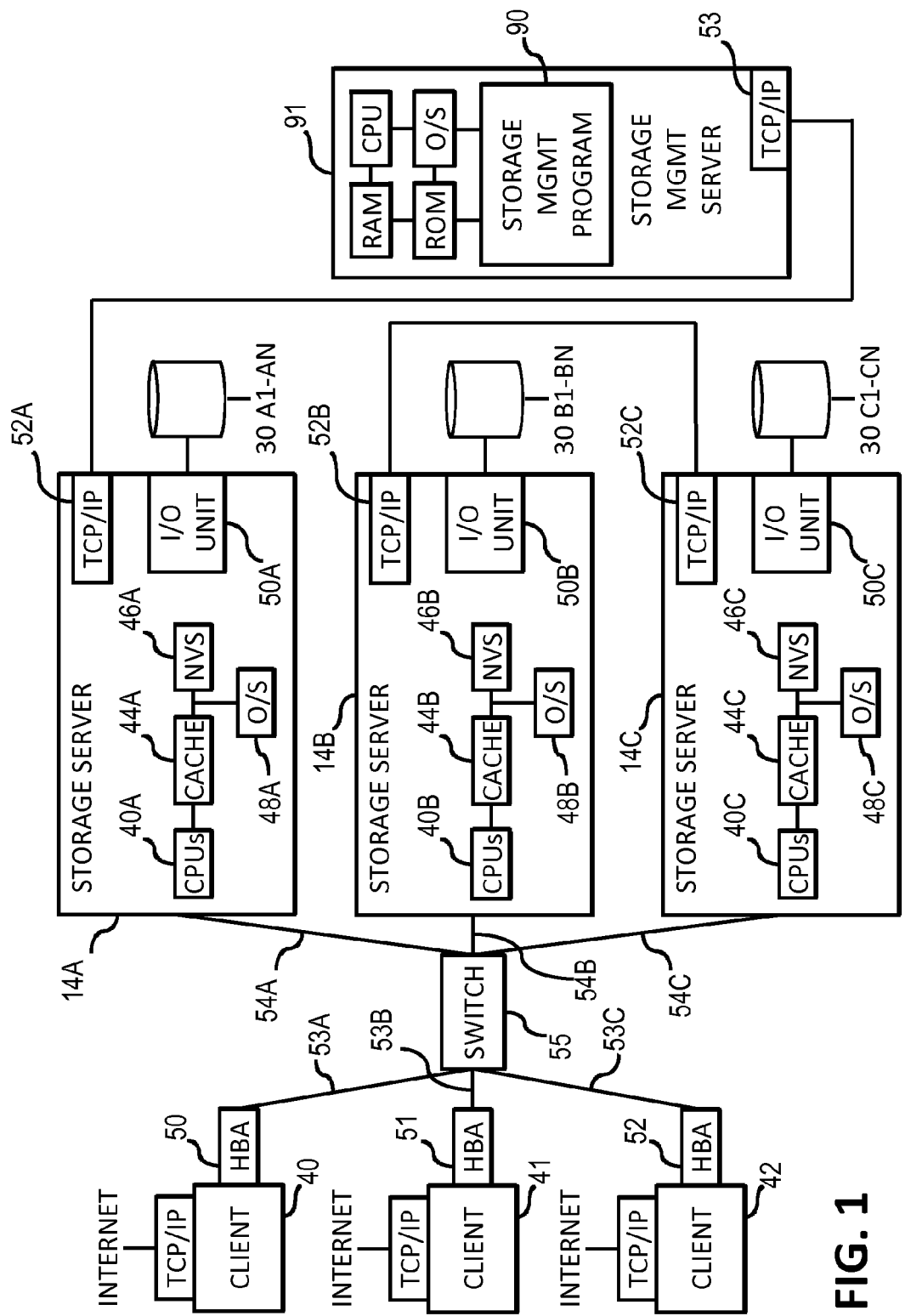
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14 *a,b,c* with multiple CPUs 40 *a,b,c* per cluster (See FIG. 2, following, for CPU organization in each cluster), cache 44 *a,b,c*, nonvolatile storage ("NVS") 46 *a,b,c*, operating system 48 *a,b,c*, I/O unit 50 *a,b,c*, and TCP/IP adapter card 52 *a,b,c*. Each of the storage servers 14 *a,b,c* manages storage allocation and access to multiple storage devices (such as disks) 30 *a*1-*an*, 30 *b*1-*bn*, and 30 *c*1-*cn*, respectively, by clients 40, 41 and 42.

Clients 40, 41 and 42 have adapter cards 50, 51 and 52, such as a Fibre Channel adapter cards, for connection via a communication path 53 *a,b,c*, such as a Fibre Channel, to a switch 55. Switch 55 can be coupled to storage servers 14 *a,b,c* via host busses 54 *a,b,c*, and can forward a request from any of the clients 40, 41 or 42 to any of the storage servers 14 *a,b,c* as configured on the client. An administrator has allocated to each of the clients 40, 41 and 42 a number of storage "volumes." Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
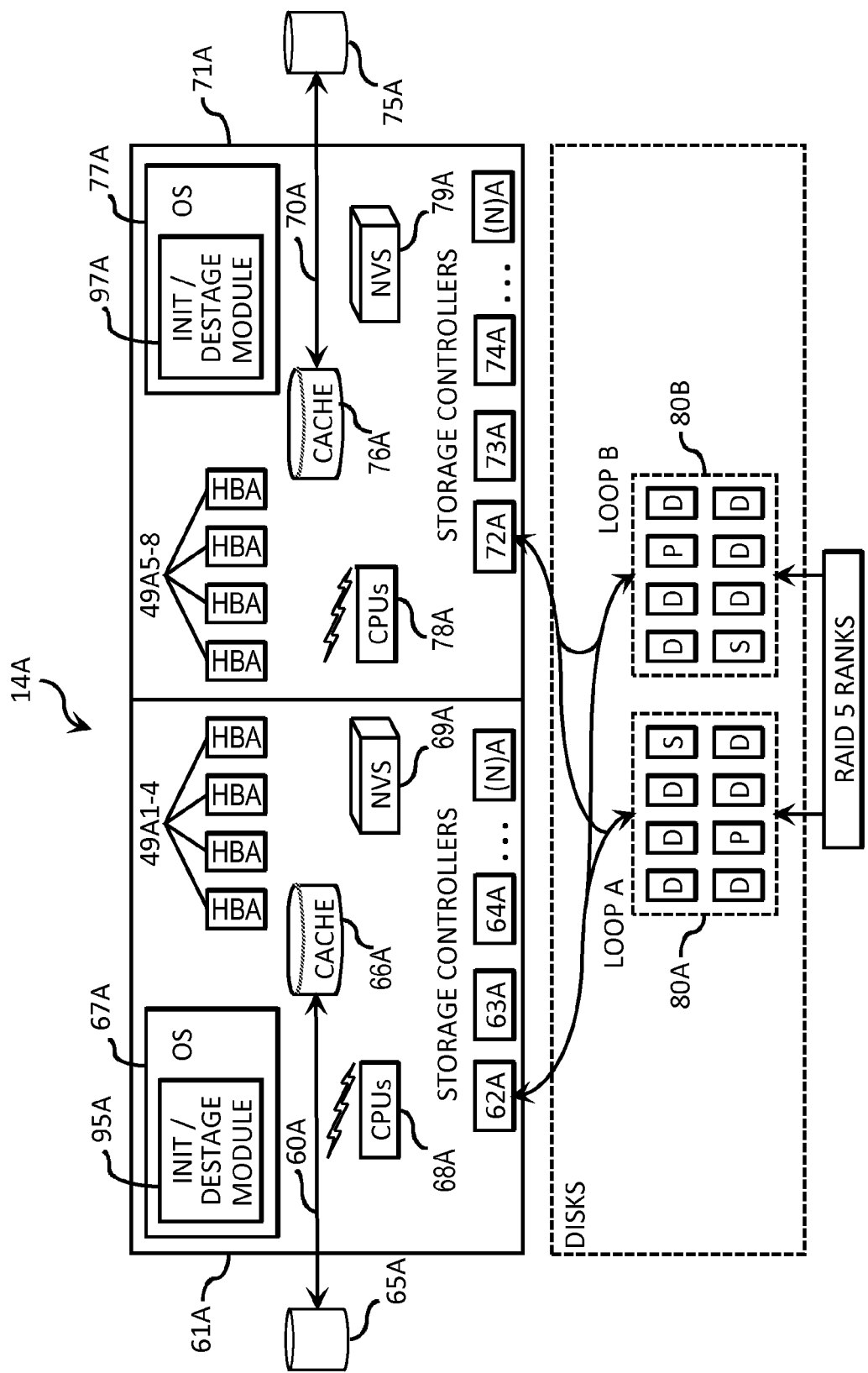
FIG. 2 is a block diagram of one of the storage servers of FIG. 1.

In the exemplary embodiment illustrated in FIG. 2, storage controller 14*a* (and likewise storage controller 14*b* and *c*) includes two identical clusters 61*a* and 71*a* of CPUs 68*a* and 78*a*, cache 66*a* and 76*a*, NVS 69*a* and 79*a*, and any number of pairs of device adapters (62*a*-(N)*a* and 72*a*-(N)*a* per cluster). There is a shared cache (semiconductor) memory 66*a* and 76*a* for each cluster 61*a* and 71*a*, respectively. Cache 66*a* and 76*a* each contain a directory of data files stored on each cache, respectively. The directory includes any number of directory entries associated with each of the data files.

Each cluster also contains battery backed-up storage 69*a* and 79*a* (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

NVS 69*a* and 79*a* are interconnected with disks 65*a* and 75*a* via communication links 60*a* and 70*a*, respectively. In certain embodiments, communication links 60*a* and 70*a* are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65*a* and 75*a* comprise one or more optical storage media, one or more magnetic storage media, one or more electronic storage media, and combinations thereof. In certain embodiments, disks 65*a* and 75*a* are external to clusters 61*a* and 71*a*. In certain embodiments, disks 65*a* and 75*a* are internal to clusters 61*a* and 71*a*.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14 *a,b,c* via a SAN network. Alternately, there can be a separate instance of module 90 executing on each storage server/controller 14 *a,b,c* and communicating with the other instances of program 90 on the other storage servers via a TCP/IP network. One of ordinary skill in the art will appreciate that a variety of implementations of SMP module in communication with the overall storage subsystem are contemplated.

Referring again to FIG. 2, server 14*a* is shown including operating systems 67*a* and 77*a*, one for each cluster. As one of ordinary skill in the art will appreciate, operating systems 67*a* and 77*a* may be physically or virtually placed in a variety of locations. For purposes of illustration, the operating systems 67*a* and 77*a* are shown incorporated into each cluster as shown. In one embodiment, CPUs 68*a* and 78*a* may execute portions of the operating systems 67*a* and 77*a*. Each operating system 67*a* and 77*a* includes initialization/destage modules 95*a*, 97*a*, as is shown. In one embodiment, initialization/destage modules 95*a* and 97*a* may operate to implement various aspects of the present invention, in conjunction with the operating systems 67*a* and 77*a*, the depicted CPUs, cache memory, NVS, etc., such as carrying out initialization processes for a portion of storage while concurrently and/or subsequently destaging data to an associated storage device. While initialization/destage modules 95*a* and 97*a* are shown incorporated into the operating systems 67*a* and 77*a*, one of ordinary skill in the art will appreciate that the initialization/destage modules may be physically or logically located elsewhere, yet remain in communication with the depicted CPUs, cache memory, NVS, etc. The functionality of initialization/destage modules 95*a* and 97*a* will be further described, following.

As previously described, an extent may be considered a contiguous area of storage. In one embodiment, an extent may be 1 GB in size. One of ordinary skill in the art will appreciate that extents may vary in size, however. The mechanisms of the present invention may be operable on portions of data such as extents, for example. However, one of ordinary skill in the art will appreciate that other measurements of storage may be utilized, physical (such as a track or stride) or logical (such as a volume). To this regard, the illustrated embodiments refer to the functionality of initialization and data destage operable on portions of storage.

Storage initialization work may be divisible by these portions of storage (such as a certain number of tracks or strides). A background task may be adapted to initialize a certain number of strides at a time, for example. As will be further described, mechanisms of the present invention perform implicit and explicit throttling of storage initialization operations. For example, exemplary implicit throttling operations may include limiting the number of parallel threads performing initialization work on a given storage unit or collection of devices, and limiting the number of storage units or collection of units being initialized at the same time on a single adapter, for example. Additionally, the total number of storage units or collection of devices may be limited that may be initialized at the same time.

In view of each of these exemplary implicit throttling operations, when a certain percentage of finite resources in the computing environment (e.g., when a predetermined percentage of a finite amount of data structures that may be used for initialization work) is exceeded, at least one of the finite resources may be deferred to data destage/initialization tasks performed in the foreground. As was previously indicated, explicit throttling operations may be conducted as well, including taking snapshots of read/write activity on each storage unit or collection of units every predetermined time interval. This snapshot may be adapted to discount any activity related to background task initialization work. In other words, the snapshot activity records activity outside of the background task initialization work. When the read/write (i.e., storage activity) exceeds a predetermined threshold, the initialization may be throttled back to initialize a certain number of the portions of storage (e.g., strides) at one time, and/or a time delay is injected between initialization operations performed on each stride.

Figure 3:
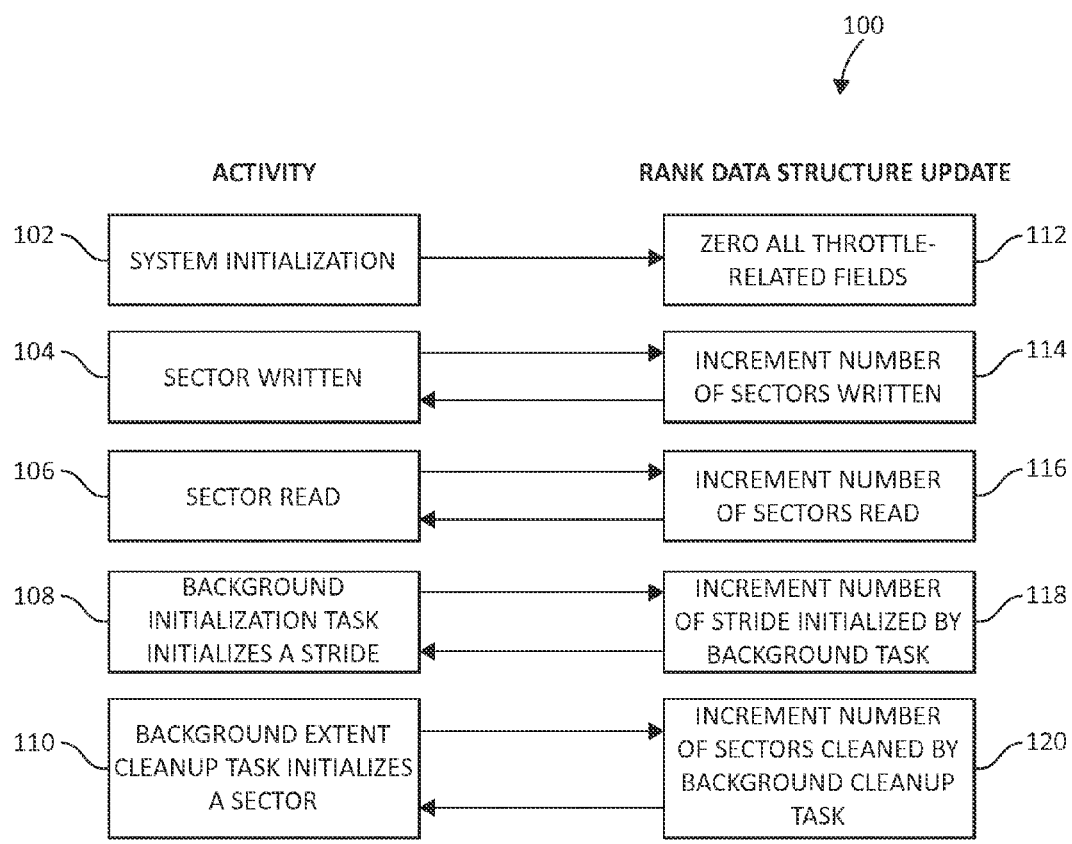
FIG. 3 is a listing of various system activities according to aspects of the present invention, with corresponding changes in rank data structure.

Turning now to FIG. 3, following, an exemplary table 100 of storage activity and corresponding rank data structure involvement is illustrated according to various aspects of the present invention. Such rank data structure changes may be utilized by mechanisms of the present invention to perform various implicit and/or explicit throttling operations. As a first step, a system initialization is performed (step 102) which "zeros" all throttle-related data structure fields (step 112). As a sector in an associated storage unit (e.g., disk) is written pursuant to a write request (step 104), the number of written sectors is incremented (step 114).

As a sector on the storage disk is read (step 106) pursuant to a read request, for example, the number of read sectors is incremented (step 116). As a background initialization task performs an initialization operation to initialize a particular stride (step 108), the number of strides initialized by the particular background task is incremented (step 118). As a background extent cleanup task initializes a sector (step 110), the number of sectors cleaned by the background cleanup task is incremented (step 120).

Figure 4:
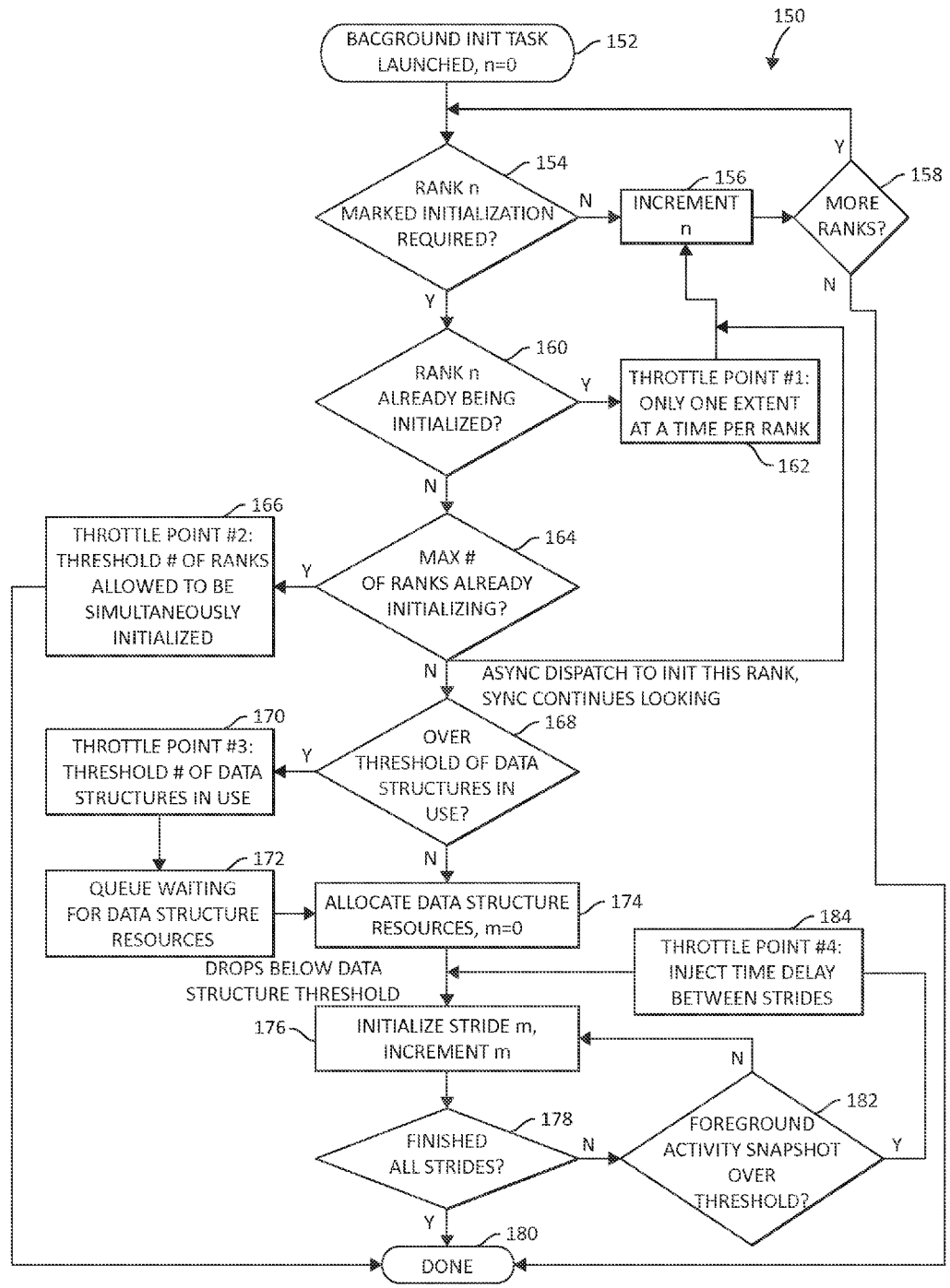
FIG. 4 is a flow chart diagram of an exemplary method for throttling storage initialization for data destage according to various aspects of the present invention.

FIG. 4, following, is a flow chart diagram of an exemplary method 150 for facilitating storage initialization (both explicit and implicit) incorporating various aspects of the present invention. Method 150 begins with a background initialization task launched (step 152) with a corresponding n (e.g., storage rank) value of zero. If, for rank marked n, an initialization operation is not required (step 154), the method 150 then increments n (step 156), and queries whether more ranks need be examined (step 158). If so, the method 150 returns to step 154 as previously described. Returning to step 154, if initialization is required for a particular rank n, the method 150 then queries if the rank n is already being initialized (step 160). If so, a first exemplary throttle point is entered, where one extent at a time per rank may be allowed pursuant to an implicit throttling operation as previously indicated.

Returning to step 160, if a rank n is determined to not be already initializing, the method 150 moves to step 164, where the method 150 queries whether a maximum number of ranks is already concurrently initializing (step 164). If so, a second exemplary throttle point is entered, where a threshold number of ranks allowed to be simultaneously initialized (step 166), and the method 150 moves to step 180.

Returning to step 164, if the maximum number of ranks already being initialized is not exceeded, an asynchronous dispatch operation is performed to initialize the particular rank in question, while the synchronous operation continues its examination for more ranks requiring initialization by moving to step 156 as previously described. In step 168, if a threshold of data structures that reside in a finite pool shared with the foreground processes is determined to have been crossed, a third exemplary throttle point is reached, where the background task queues waiting for one or more of the data structures in use to be released (step 172), and only if use drops below the data structure threshold (e.g., a minimum data structure usage) are the data structure resources then allocated by the background task. A value m is made equal to zero (step 174), and the stride or strides related to m is initialized and m is incremented (step 176). It must be appreciated that there may be more than one stride corresponding to m and 1 to n parallel threads initializing strides, which allows other throttling mechanism gained by less parallel threads and/or each thread initializing less strides at the given time. Once all strides have finished having associated initialization work performed on them (step 178), the method 150 ends (again, step 180). Alternatively, if initialization work is not yet complete, and foreground activity snapshot analysis is not above a predetermined threshold (step 182), the method returns to step 176 as previously described. Finally, if foreground activity snapshot analysis exceeds the threshold (again, step 182), a fourth exemplary throttle point is reached, where a time delay may be injected between initialization work performed on particular strides (step 184). The method 150 then returns to step 176 as previously indicated.

Figure 5:
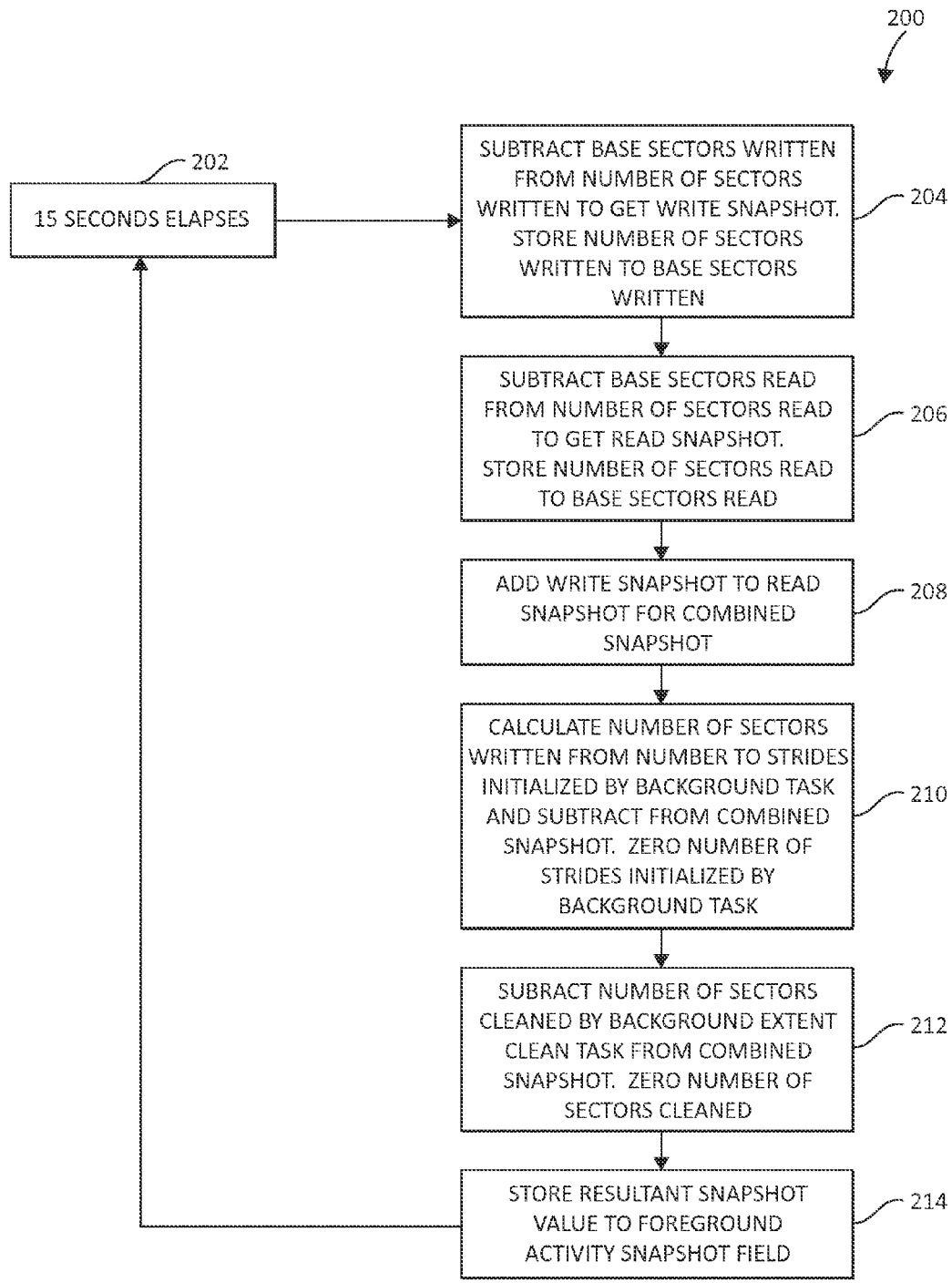
FIG. 5 is a flow chart diagram of an exemplary method for throttling storage initialization, incorporating snapshot functionality to perform an explicit throttling operation.

Turning now to FIG. 5, an exemplary method 200 for performing explicit throttling operations, including snapshot functionality previously introduced, is illustrated in a flow chart diagram. The exemplary functionality depicted pursuant to method 200 occurs in the illustrated embodiment on a predetermined time interval of 15 seconds (step 202), although one of ordinary skill in the art will appreciate that the predetermined time interval may vary according to a particular implementation. The exemplary steps in method 200 may be adapted to leverage data structures such as those updated in FIG. 3 depicted previously.

As a first step, base sectors written are subtracted from the number of sectors written (e.g., the number of sectors written as incremented in step 114, FIG. 3) to obtain a write snapshot. The number or sectors written is then stored as the new base sectors written (step 204). As a following step, the base sectors read is subtracted from a number of sectors read to obtain a read snapshot. The number of sectors read is then stored as the new base sectors read (step 206). The write snapshot is added to the read snapshot to render a combined snapshot (step 208). The number of sectors written by the background initialization task is then calculated from the number of strides initialized by the applicable background task. This resultant is subtracted from the combined snapshot. The number of strides initialized by the associated background task is then reset to zero (step 210).

The number of sectors cleaned by a background extent clean task is subtracted from the combined snapshot. The number of sectors cleaned is then zeroed (step 212). Finally, the resultant snapshot value is stored to a foreground activity snapshot field (step 214) for use by associated background process for examination of explicit throttling requirement, and the method 200 returns to step 202 as previously described.

Figure 6:
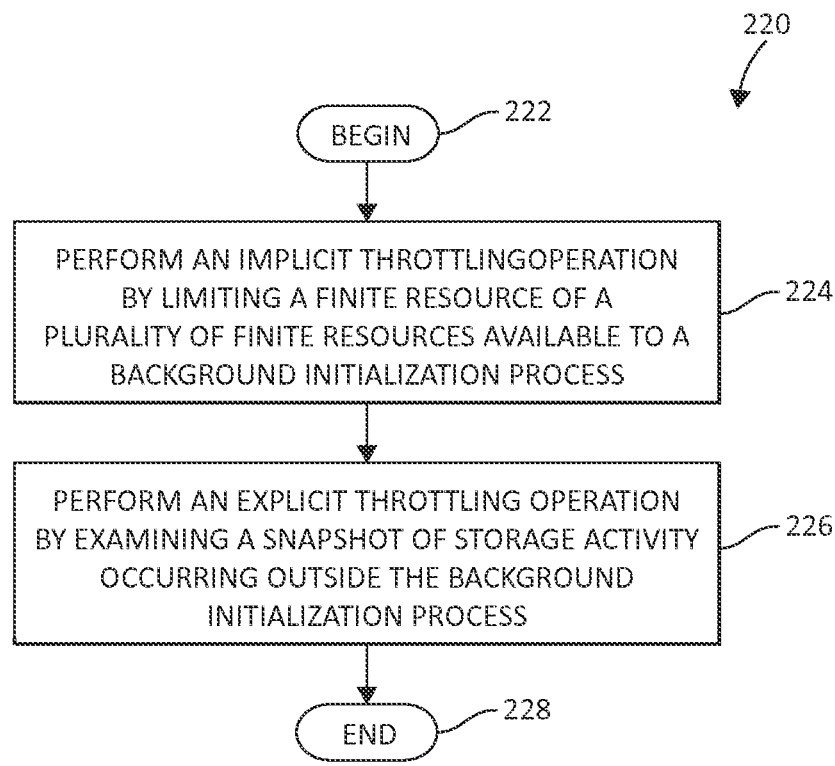
FIG. 6 is a flow chart diagram of an exemplary method for throttling storage initialization according to one embodiment of the present invention.

FIG. 6, following, illustrates an exemplary method 220 for performing throttling operations as previously described in flow chart form according to various mechanisms of the present invention. Method 220 begins (step 222) by performing an implicit throttling operation by limiting a finite resource of a plurality of finite resources available to a background initialization process (step 224). Depending on need and circumstances (for example as previously described in FIG. 5), explicit throttling operations may be additionally performed. Accordingly, in step 226, the method 220 performs an explicit throttling operation by examining a snapshot of storage activity occurring outside the background initialization process (step 226). The method 220 then ends (step 228).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for throttling storage initialization for data destage in a computing storage environment by a processor device, comprising at least one of:

performing an implicit throttling operation by limiting at least one of a plurality of finite resources available to a background initialization process, the background initialization process adapted for performing the storage initialization ahead of a data destage request, wherein if a predefined percentage of the plurality of finite resources is utilized, the at least one of the plurality of finite resources is deferred to a foreground process that is triggered by the data destage request, the foreground process adapted to perform the storage initialization ahead of a data destage performed pursuant to the data destage request, wherein the implicit throttling operation further includes:

limiting at least one of a plurality of associated storage devices concurrently being initialized on a single storage adapter, the plurality of associated storage devices including the at least one associated storage device, wherein the plurality of associated storage devices include a plurality of sectors, and limiting a total number of the plurality of associated storage devices concurrently being initialized; and performing an explicit throttling operation by examining a snapshot of storage activity occurring outside the background initialization process by performing each one of:

subtracting base sectors written from a number of sectors written to obtain a write snapshot, wherein the number of sectors written are stored as new base sectors written, subtracting base sectors read from a number of sectors read to obtain a read snapshot, wherein the number of sectors read are stored as new base sectors read, adding the write snapshot to the read snapshot to render a combined snapshot, calculating a number of sectors written by the background initialization process from a number of strides initialized by the background initialization process, resetting the number of strides initialized by the background initialization process to zero, and subtracting the number of sectors that are cleaned by a background extent clean task from the combined snapshot, wherein the number of sectors that are cleaned are zeroed, and a resultant from the subtracting the number of sectors that are cleaned by the background extent clean task from the combined snapshot is stored to a foreground activity snapshot field for the examining the snapshot of storage activity occurring outside the background initialization process, wherein if the storage activity exceeds a predetermined level:

the storage initialization if at least one of limited per a predetermined time to one of a predetermined number of portions of the storage and a predetermined size of the storage, and a delay is injected into the background initialization process.

2. The method of claim 1, wherein performing an implicit throttling operation by limiting the at least one of the plurality of finite resources available to the background initialization process includes limiting at least one of a plurality of parallel threads performing initialization work on at least one associated storage device.

3. The method of claim 1, wherein examining the snapshot of storage activity occurring outside the background initialization process is performed at one of the predetermined time and an additional predetermined time.

4. The method of claim 1, wherein the foreground process is adapted for additionally performing initialization operations performed by the background initialization process.

5. The method of claim 1, wherein performing the explicit throttling operation includes adjusting the predetermined level based on one of a type and a configuration of an associated storage device at which the explicit throttling operation is taking place.

6. The method of claim 5, wherein adjusting the predetermined level based on one of the type and the configuration of the associated storage device includes adjusting the predetermined level based on whether the associated storage device is one of a solid state drive (SSD) device, an enterprise hard disk storage device (HDD), a hard disk storage device, and a tape storage device.

7. A system for throttling storage initialization for data destage in a computing storage environment, comprising:

a processor device operable in the computing storage environment, wherein the processor device is adapted for performing at least one of:

performing an implicit throttling operation by at least one of a plurality of finite resources available to a background initialization process, the background initialization process adapted for performing the storage initialization ahead of a data destage request, wherein if a predefined percentage of the plurality of finite resources is utilized, the at least one of the plurality of finite resources is deferred to a foreground process that is triggered by the data destage request, the foreground process adapted to perform the storage initialization ahead of a data destage request performed pursuant to the data destage request, wherein the implicit throttling operation further includes:

limiting at least one of a plurality of associated storage devices concurrently being initialized on a single storage adapter, the plurality of associated storage devices including the at least one associated storage device, wherein the plurality of associated storage devices include a plurality of sectors, and limiting a total number of the plurality of associated storage devices concurrently being initialized; and performing an explicit throttling operation by examining a snapshot of storage activity occurring outside the background initialization process by performing each one of:

subtracting base sectors written from a number of sectors written to obtain a write snapshot, wherein the number of sectors written are stored as new base sectors written, subtracting base sectors read from a number of sectors read to obtain a read snapshot, wherein the number of sectors read are stored as new base sectors read, adding the write snapshot to the read snapshot to render a combined snapshot, calculating a number of sectors written by the background initialization process from a number of strides initialized by the background initialization process, resetting the number of strides initialized by the background initialization process to zero, and subtracting the number of sectors that are cleaned by a background extent clean task from the combined snapshot, wherein the number of sectors that are cleaned are zeroed, and a resultant from the subtracting the number of sectors that are cleaned by the background extent clean task from the combined snapshot is stored to a foreground activity snapshot field for the examining the snapshot of storage activity occurring outside the background initialization process, wherein if the storage activity exceeds a predetermined level:

the storage initialization is at least one of limited per a predetermined time to one of a predetermined number of portions of the storage and a predetermined size of the storage, and a delay is injected into the background initialization process.

8. The system of claim 7, wherein the processor device is further adapted for, pursuant to performing an implicit throttling operation by limiting the at least one of the plurality of finite resources available to the background initialization process,
limiting at least one of a plurality of parallel threads performing initialization work on at least one associated storage device.

9. The system of claim 7, wherein the processor device is further adapted for, pursuant to examining the snapshot of storage activity occurring outside the background initialization process, examining the snapshot of storage activity taken at one of the predetermined time and an additional predetermined time.

10. The system of claim 7, wherein the foreground process is adapted for additionally performing initialization operations performed by the background initialization process.

11. The system of claim 7, wherein the processor device is further adapted for, pursuant to performing the explicit throttling operation, adjusting the predetermined level based on one of a type and a configuration of an associated storage device at which the explicit throttling operation is taking place.

12. The system of claim 11, wherein the processor device is further adapted for, pursuant to adjusting the predetermined level based on one of the type and the configuration of the associated storage device, adjusting the predetermined level based on whether the associated storage device is one of a solid state drive (SSD) device, an enterprise hard disk storage device (HDD), a hard disk storage device, and a tape storage device.

13. The system of claim 7, wherein the at least one of the plurality of finite resources includes a data structure taken from a finite pool of data structures.

14. A computer program product for throttling storage initialization for data destage in a computing storage environment by a processor device, the computer program product comprising a non-transitory computer-readable storage medium having computer-readable program code portions stored therein, the computer-readable program code portions comprising:
a first executable portion for performing an implicit throttling operation by limiting at least one of a plurality of finite resources available to a background initialization process, the background initialization process adapted for performing the storage initialization ahead of a data destage request, wherein if a predefined percentage of the plurality of finite resources is utilized, the at least one of the plurality of finite resources is deferred to a foreground process that is triggered by the data destage request, the foreground process adapted to perform the storage initialization ahead of a data destage performed pursuant to the data destage request, wherein the implicit throttling operation further includes:
limiting at least one of a plurality of associated storage devices concurrently being initialized on a single storage adapter, the plurality of associated storage devices including the at least one associated storage device, wherein the plurality of associated storage devices include a plurality of sectors, and
limiting a total number of the plurality of associated storage devices concurrently being initialized; and
a second executable portion for performing an explicit throttling operation by examining a snapshot of storage activity occurring outside the background initialization process by performing each one of:
subtracting base sectors written from a number of sectors written to obtain a write snapshot, wherein the number of sectors written are stored as new base sectors written,
subtracting base sectors read from a number of sectors read to obtain a read snapshot,
wherein the number of sectors read are stored as new base sectors read,
adding the write snapshot to the read snapshot to render a combined snapshot,
calculating a number of sectors written by the background initialization process from a number of strides initialized by the background initialization process,
resetting the number of strides initialized by the background initialization process to zero, and
subtracting the number of sectors that are cleaned by a background extent clean task from the combined snapshot, wherein the number of sectors that are cleaned are zeroed, and a resultant from the subtracting the number of sectors that are cleaned by the background extent clean task from the combined snapshot is stored to a foreground activity snapshot field for the examining the snapshot of storage activity occurring outside the background initialization process, wherein if the storage activity exceeds a predetermined level:
the storage initialization is at least one of limited per a predetermined time to one of a predetermined number of portions of the storage and a predetermined size of the storage, and a delay is injected into the background initialization process.

15. The computer program product of claim 14, further including a third executable portion for, pursuant to performing an implicit throttling operation by limiting the at least one of the plurality of finite resources available to the background initialization process,
limiting at least one of a plurality of parallel threads performing initialization work on at least one associated storage device.

16. The computer program product of claim 14, wherein examining the snapshot of storage activity occurring outside the background initialization process is performed at one of the predetermined time and an additional predetermined time.

17. The computer program product of claim 14, wherein the foreground process is adapted for additionally performing initialization operations performed by the background initialization process.

18. The computer program product of claim 14, further including a third executable portion for, pursuant to performing the explicit throttling operation, adjusting the predetermined level based on one of a type and a configuration of an associated storage device at which the explicit throttling operation is taking place.

19. The computer program product of claim 18, further including a fourth executable portion for, pursuant to adjusting the predetermined level based on one of the type and the configuration of the associated storage device, adjusting the predetermined level based on whether the associated storage device is one of a solid state drive (SSD) device, an enterprise hard disk storage device (HDD), a hard disk storage device, and a tape storage device.

* * * * *